United States Patent
Xu et al.

(10) Patent No.: US 11,665,661 B2
(45) Date of Patent: May 30, 2023

(54) TIMING ADVANCE TIMER FOR FULL DUPLEX COMMUNICATION

(71) Applicant: QUALCOMM Incorporated, San Diego, CA (US)

(72) Inventors: Huilin Xu, Temecula, CA (US); Muhammad Sayed Khairy Abdelghaffar, San Jose, CA (US); Ahmed Attia Abotabl, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 119 days.

(21) Appl. No.: 17/302,297

(22) Filed: Apr. 29, 2021

(65) Prior Publication Data
US 2021/0410092 A1    Dec. 30, 2021

Related U.S. Application Data

(60) Provisional application No. 63/045,549, filed on Jun. 29, 2020.

(51) Int. Cl.
*H04W 56/00* (2009.01)
*H04W 74/08* (2009.01)
*H04L 5/14* (2006.01)

(52) U.S. Cl.
CPC ............ *H04W 56/005* (2013.01); *H04L 5/14* (2013.01); *H04W 56/001* (2013.01); *H04W 74/0891* (2013.01)

(58) Field of Classification Search
None
See application file for complete search history.

(56) References Cited

U.S. PATENT DOCUMENTS

| | | | |
|---|---|---|---|
| 2009/0296609 A1* | 12/2009 | Choi | H04L 43/16 370/281 |
| 2015/0245307 A1 | 8/2015 | Chen et al. | |
| 2020/0413453 A1* | 12/2020 | Shao | H04L 5/0082 |
| 2021/0194571 A1* | 6/2021 | Ma | H04B 7/18504 |
| 2021/0345278 A1* | 11/2021 | Takeda | H04W 52/02 |

FOREIGN PATENT DOCUMENTS

| | | |
|---|---|---|
| WO | WO-2017111987 A1 | 6/2017 |
| WO | WO-2018232123 A1 | 12/2018 |

OTHER PUBLICATIONS

International Search Report and Written Opinion—PCT/US2021/030209—ISA/EPO—dated Aug. 12, 2021.

* cited by examiner

*Primary Examiner* — Saad Khawar
(74) *Attorney, Agent, or Firm* — Qualcomm Incorporated

(57) ABSTRACT

Various aspects of the present disclosure generally relate to wireless communication. In some aspects, a user equipment may receive a timing advance (TA) command indicating partial TA compensation, start a TA timer for partial TA compensation for full duplex based at least in part on receiving the TA command, and perform a synchronization procedure based at least in part on expiration of the TA timer for partial TA compensation for full duplex. Numerous other aspects are provided.

18 Claims, 6 Drawing Sheets

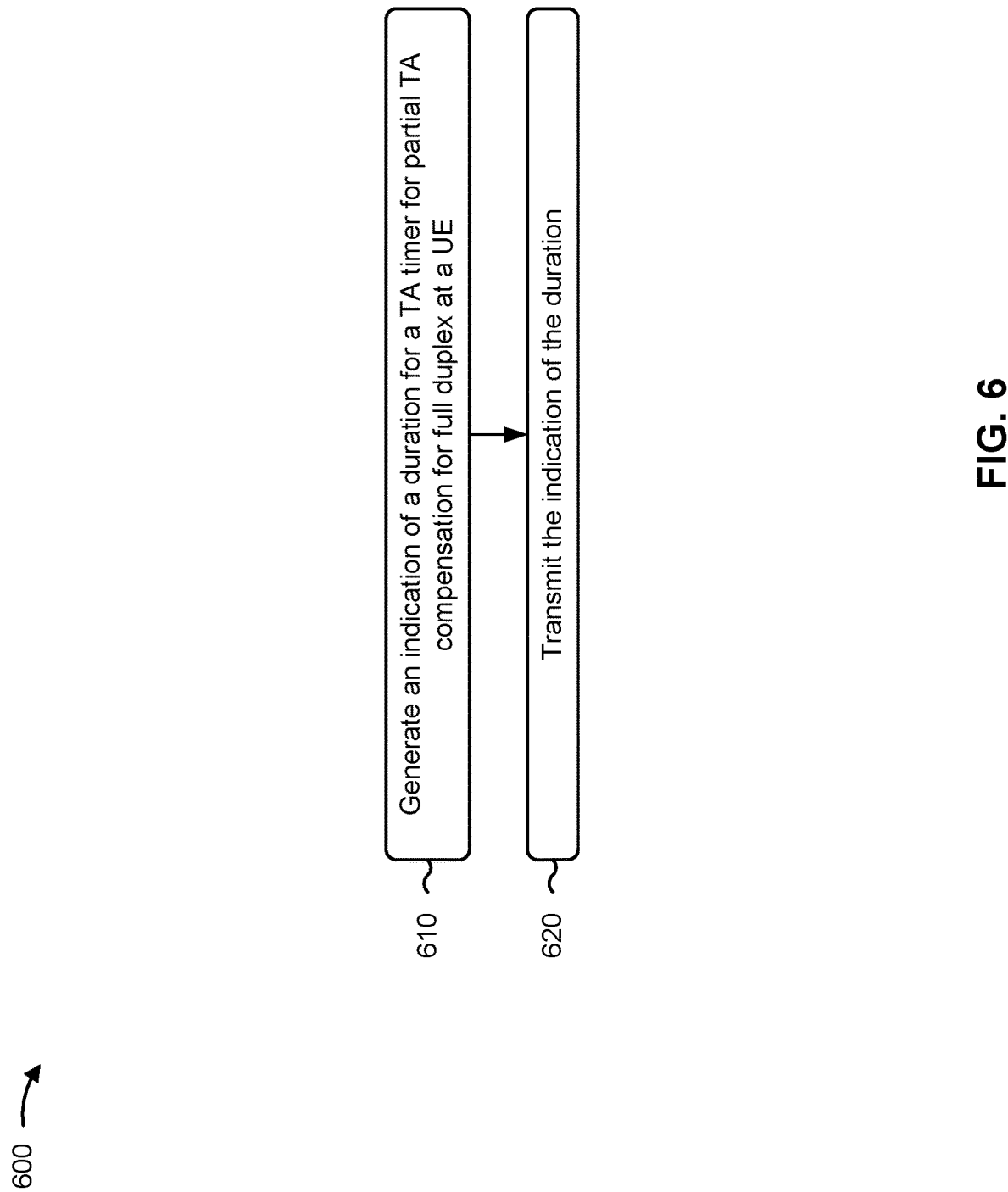

TIMING ADVANCE TIMER FOR FULL DUPLEX COMMUNICATION

CROSS-REFERENCE TO RELATED APPLICATION

This Patent Application claims priority to U.S. Provisional Patent Application No. 63/045,549, filed on Jun. 29, 2020, entitled "TIMING ADVANCE TIMER FOR FULL DUPLEX COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a timing advance timer for full duplex communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) may include receiving a timing advance (TA) command indicating partial TA compensation, starting a TA timer for partial TA compensation for full duplex based at least in part on receiving the TA command, and performing a synchronization procedure based at least in part on expiration of the TA timer for partial TA compensation for full duplex.

In some aspects, a method of wireless communication performed by a base station may include determining a duration for a TA timer for partial TA compensation for full duplex at a UE, and transmitting an indication of the duration based at least in part on determining the duration.

In some aspects, a method of wireless communication performed by a base station may include generating an indication of a duration for a TA timer for partial TA compensation for full duplex at a UE and transmitting the indication of the duration.

In some aspects, a non-transitory computer-readable medium storing a set of instructions for wireless communication may include one or more instructions that, when executed by one or more processors of a UE, cause the UE to receive a TA command indicating partial TA compensation, start a TA timer for partial TA compensation for full duplex based at least in part on receiving the TA command, and perform a synchronization procedure based at least in part on expiration of the TA timer for partial TA compensation for full duplex.

In some aspects, a non-transitory computer-readable medium storing a set of instructions for wireless communication may include one or more instructions that, when executed by one or more processors of a base station, cause the base station to determine a duration for a TA timer for partial TA compensation for full duplex at a UE, and transmit an indication of the duration based at least in part on determining the duration.

In some aspects, a non-transitory computer-readable medium storing a set of instructions for wireless communication may include one or more instructions that, when executed by one or more processors of a base station, cause the base station to generate an indication of a duration for a TA timer for partial TA compensation for full duplex at a UE, and transmit the indication of the duration.

In some aspects, a UE for wireless communication may include a memory and one or more processors coupled to the memory. The one or more processors may be configured to receive a TA command indicating partial TA compensation, start a TA timer for partial TA compensation for full duplex based at least in part on receiving the TA command, and perform a synchronization procedure based at least in part on expiration of the TA timer for partial TA compensation for full duplex.

In some aspects, a base station for wireless communication includes a memory and one or more processors coupled to the memory. The one or more processors may be configured to determine a duration for a TA timer for partial TA compensation for full duplex at a UE and transmit an indication of the duration based at least in part on determining the duration.

In some aspects, a base station for wireless communication includes a memory and one or more processors coupled to the memory. The one or more processors may be configured to generate an indication of a duration for a TA timer for partial TA compensation for full duplex at a UE and transmit the indication of the duration.

In some aspects, an apparatus for wireless communication may include means for receiving a TA command indicating partial TA compensation, means for starting a TA timer for partial TA compensation for full duplex based at least in part on receiving the TA command, and means for performing a synchronization procedure based at least in part on expiration of the TA timer for partial TA compensation for full duplex.

In some aspects, an apparatus for wireless communication may include means for determining a duration for a TA timer for partial TA compensation for full duplex at a UE and means for transmitting an indication of the duration based at least in part on determining the duration.

In some aspects, an apparatus for wireless communication may include means for generating an indication of a duration for a TA timer for partial TA compensation for full duplex at a UE and means for transmitting the indication of the duration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a base station, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
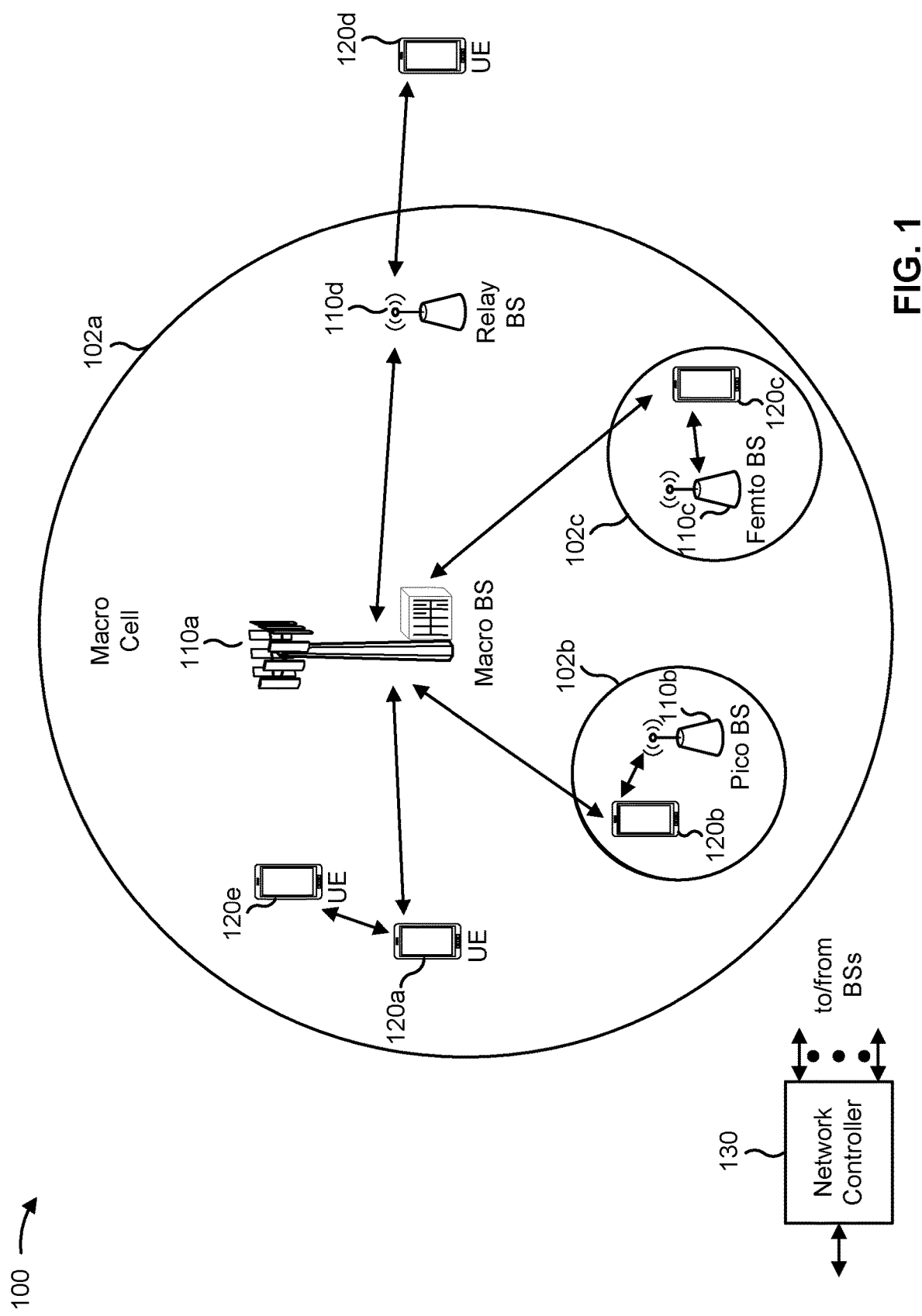
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
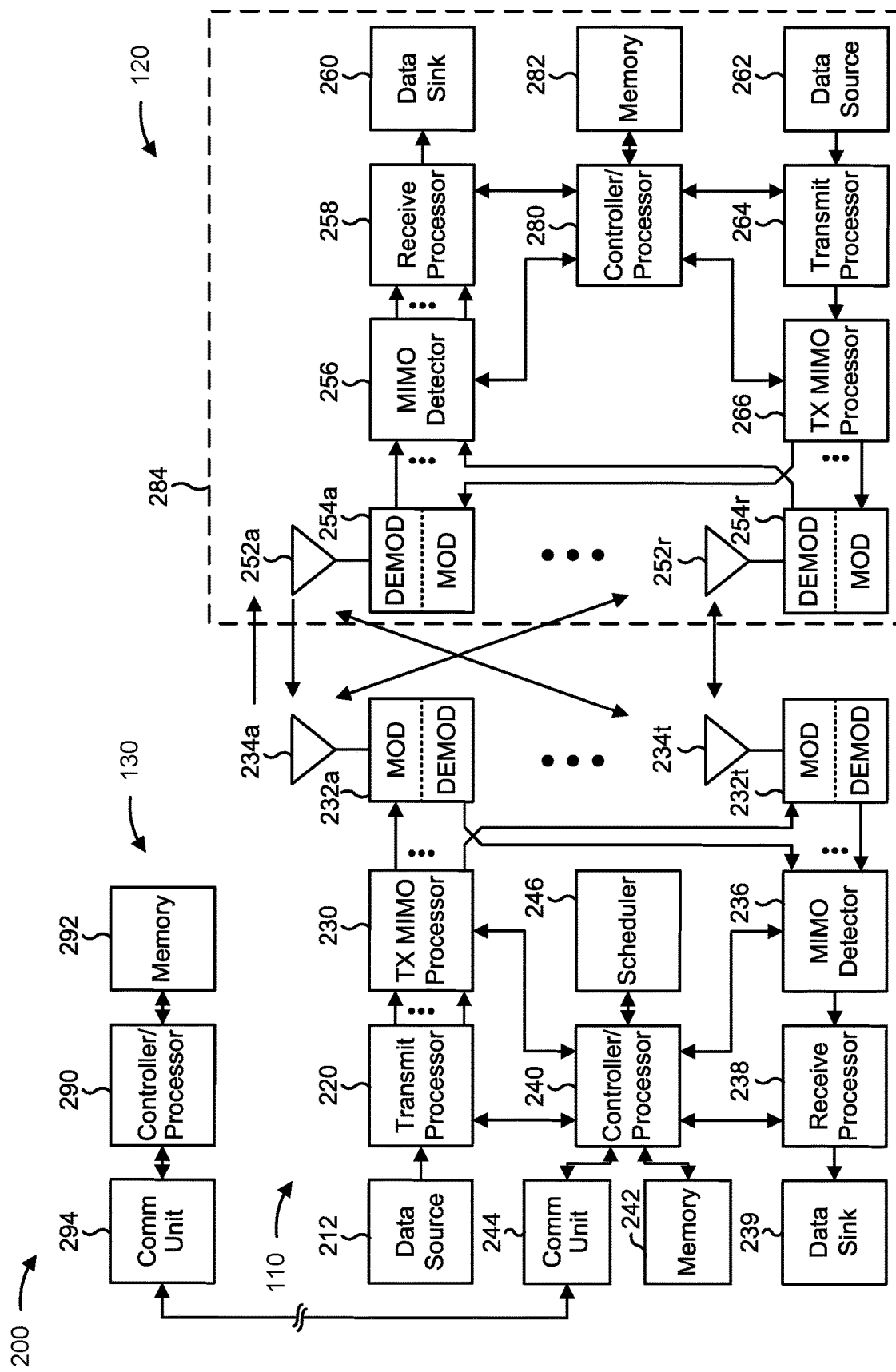
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-6).

Controller/processor 240 of base station 110, controller/processor 280 of UE 120, and/or any other component(s) of FIG. 2 may perform one or more techniques associated with a timing advance (TA) timer for partial TA compensation for full duplex, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving a TA command indicating partial TA compensation, means for starting a TA timer for partial TA compensation for full duplex based at least in part on receiving the TA command, means for performing a synchronization procedure based at least in part on expiration of the TA timer for partial TA compensation for full duplex, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a duration for a TA timer for partial TA compensation for full duplex at a UE, means for generating the indication, means for transmitting an indication of the duration based at least in part on determining the duration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
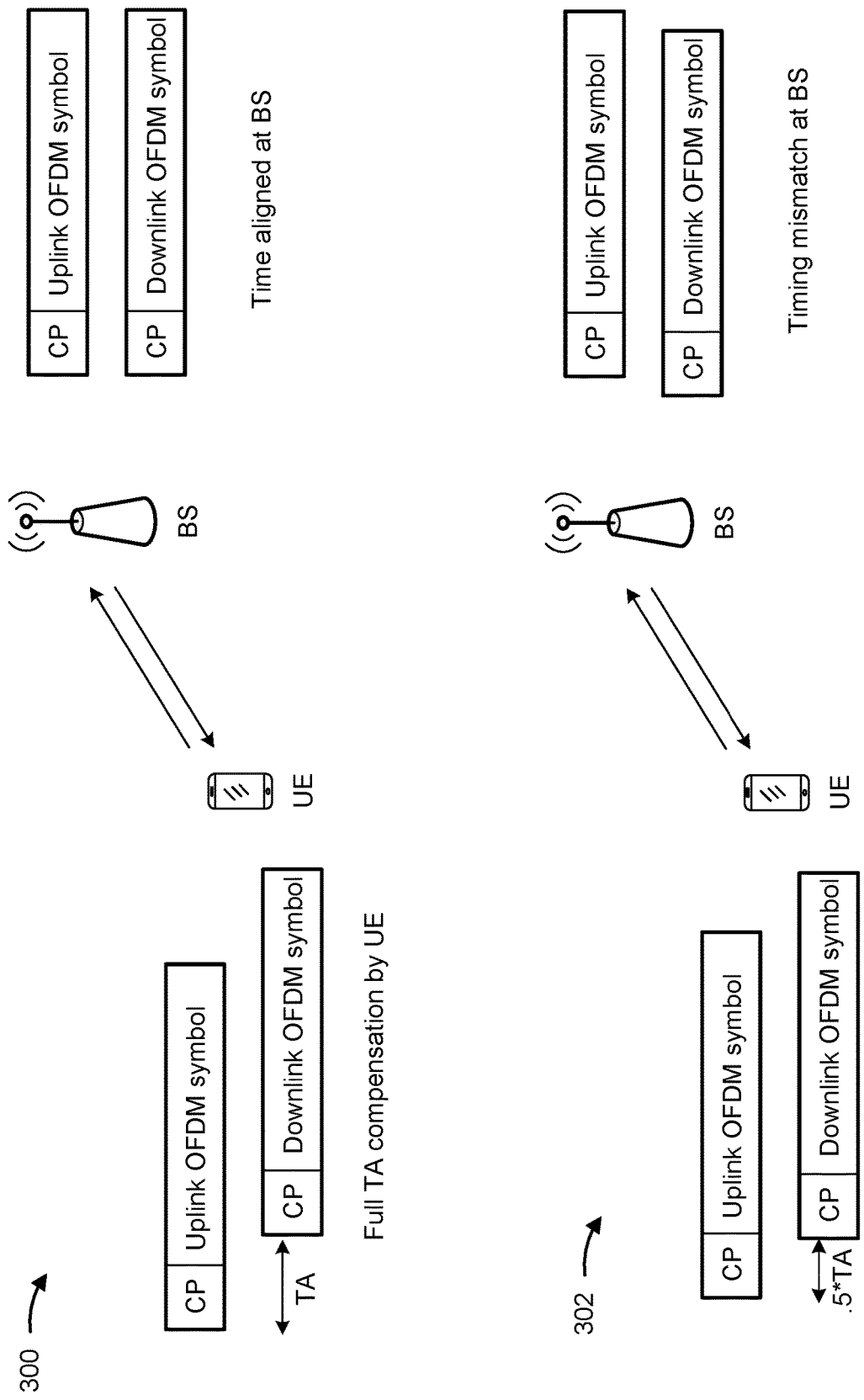
FIG. 3 is a diagram illustrating an example of timing advance (TA) compensation for full duplex, in accordance with the present disclosure.

FIG. 3 is a diagram illustrating examples 300, 302 of TA compensation for full duplex, in accordance with the present disclosure. As shown by example 300, a UE and a base station may be in full duplex mode, where the base station and the UE transmit OFDM symbols in both directions at the same time. If the UE and the base station are close, each uplink symbol may be synchronized (or nearly synchronized) in time with when the base station is expecting the uplink symbol. However, if the UE and the BS are farther apart, the uplink symbols may not be synchronized due to a propagation delay. To compensate for this propagation delay, the UE may transmit the uplink symbols sooner, by a TA value, such that uplink symbols from the UE are time aligned with uplink symbols from other UEs when received at the base station.

When the propagation delay is large, the TA value may provide for full TA compensation, as shown by example 300. Unfortunately, the TA value may exceed a cyclic prefix (CP) duration, which helps to account for any TA. This may not be a problem for half duplex as uplink symbols and downlink symbols do not use the same time and frequency resources. However, this may be a problem for full duplex due to a loss of orthogonality between uplink and downlink symbols. A UE may not be able to operate in full duplex if the propagation delay is greater than half the CP duration.

For full duplex to work properly, the TA value may need to be configured such that a timing offset between uplink and downlink symbols is not too large, so as to maintain orthogonality between uplink symbols and downlink symbols. This may naturally lead to partial TA compensation for full duplex, as shown by example 302 in FIG. 3. However, with partial TA compensation, the UE may fall out of synchronization more quickly, and there is currently no way to account for this. If uplink timing is not synchronized, communications may degrade, and the UE and the base station may waste processing and signaling resources transmitting symbols that are out of alignment.

As indicated above, FIG. 3 provides some examples. Other examples may differ from what is described with regard to FIG. 3.

According to various aspects described herein, the UE may avoid the partial TA compensation problem described above with a new TA timer (timeAlignmentTimer) that is configured for full duplex when partial TA compensation is enabled. This TA timer is in addition to any existing TA timer and may indicate a time during which uplink timing is considered synchronized if partial TA compensation is used for full duplex. If the TA timer expires, the UE may perform a random access procedure to regain uplink timing synchronization. The UE may reset the TA timer when the UE receives another uplink TA command. A duration of the TA timer may depend on how fast the uplink timing gets out of synchronization or is expected to get out of synchronization. The duration may be smaller than a duration of a TA timer for half duplex mode with full TA compensation. With the new TA timer for partial TA compensation for full duplex, the UE and the base station may maintain synchronization better, and conserve processing resources and signaling resources that would otherwise be wasted due to uplink timing being out of synchronization.

Figure 4:
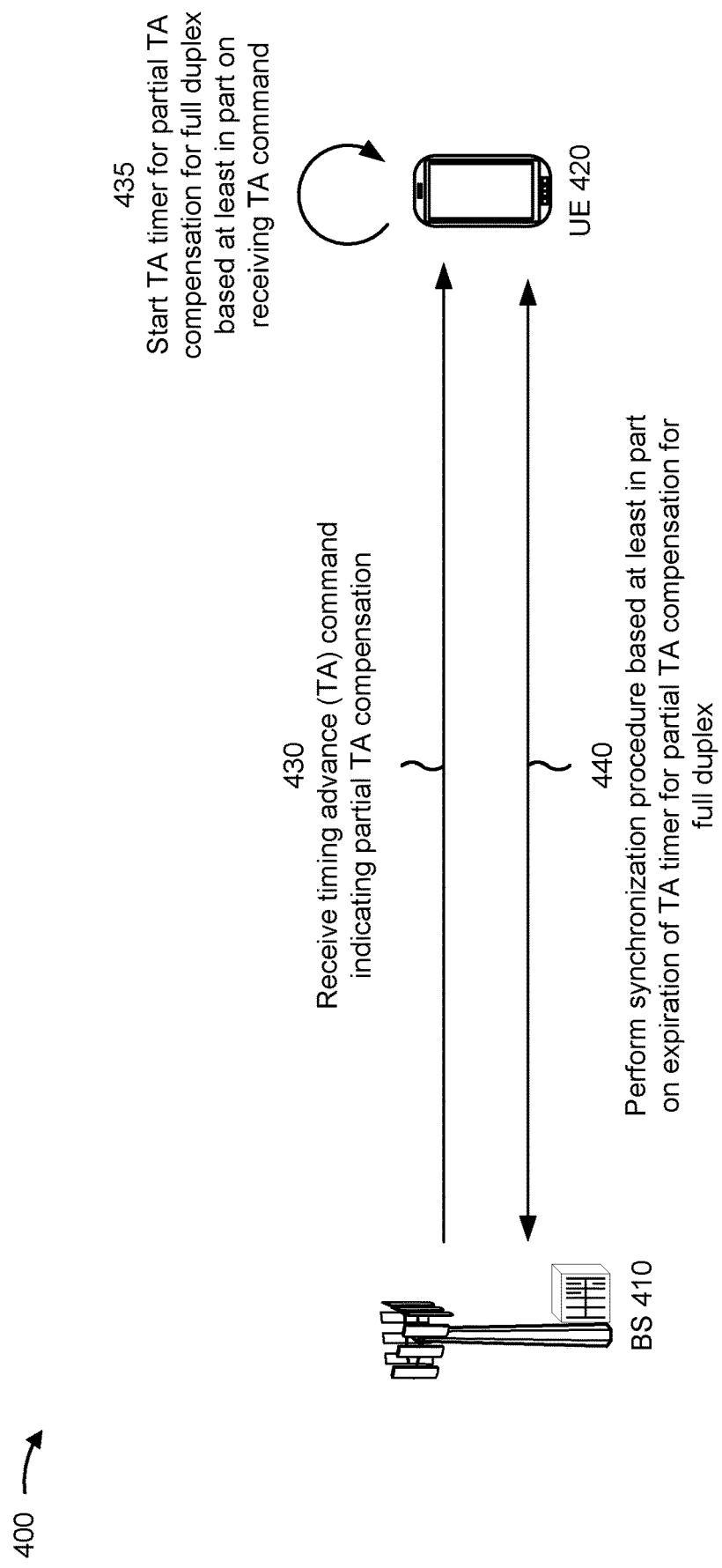
FIG. 4 is a diagram illustrating an example of a TA timer for partial TA compensation for full duplex, in accordance with the present disclosure.

FIG. 4 is a diagram illustrating an example 400 of a TA timer for partial TA compensation for full duplex, in accordance with the present disclosure. FIG. 4 shows a BS 410 (e.g., a BS 110 depicted in FIGS. 1 and 2, the UE depicted in FIG. 3) and a UE 420 (e.g., a UE 120 depicted in FIGS. 1 and 2, the UE depicted in FIG. 3) that may communicate with each other. BS 410 and UE 420 may be communicating in full duplex mode.

As shown by reference number 430, UE 420 may receive a TA command indicating partial TA compensation. UE 420 may start a TA timer for partial TA compensation for full duplex based at least in part on receiving the TA command, as shown by reference number 435. In some aspects, if UE 420 receives another TA command, UE 420 may reset the TA timer, and the TA timer may be reset to a default value.

As shown by reference number 440, the UE may perform a synchronization procedure based at least in part on expiration of the TA timer. In some aspects, the synchronization procedure may be a random access channel procedure.

In some aspects, BS 410 may determine a duration of the TA timer, and transmit an indication of the duration to UE 420. BS 410 may determine the duration based at least in part on information about UE locations, historical propagation delay information, and/or the like. In some aspects, BS 410 may determine the duration to be less than a duration of a TA timer for half duplex.

In some aspects, UE 420 may determine a TA compensation coefficient α, which may be configured by the base station, calculated by UE 420, or determined from stored configuration information (e.g., according to a standard). UE 420 may determine the duration of the TA timer for partial TA compensation for full duplex based at least in part on the TA compensation coefficient α. A smaller TA compensation coefficient α may mean less TA compensation when a shorter duration is adopted for the TA timer and the UE may get out of uplink synchronization sooner.

In some aspects, when UE 420 is switched from half duplex to full duplex, a remaining time to expire is reduced, based at least in part on a remaining time for a TA timer for half duplex. In other words, the TA timer for partial TA compensation for full duplex may expire sooner due to partial TA compensation. For example, if a remaining time to expire is 100 milliseconds (ms) for half duplex, after the switch, the reaming time to expire for full duplex may be set to a value less than 100 ms (e.g., 50 ms).

In some aspects, when switching from full duplex to half duplex, the remaining time to expire may be increased based at least in part on the remaining time for the TA timer for partial TA compensation for full duplex. This is because the TA timer for partial TA compensation for full duplex may expire later due to full uplink timing compensation. Adjusting TA timer durations when switching between full duplex and half duplex provides a more accurate trigger for synchronization procedures. As a result, the UE and the base station more successfully avoid degraded communications, loss of orthogonality, and unnecessary delays with TA compensation.

As indicated above, FIG. 4 is provided as an example. Other examples may differ from what is described with regard to FIG. 4.

Figure 5:
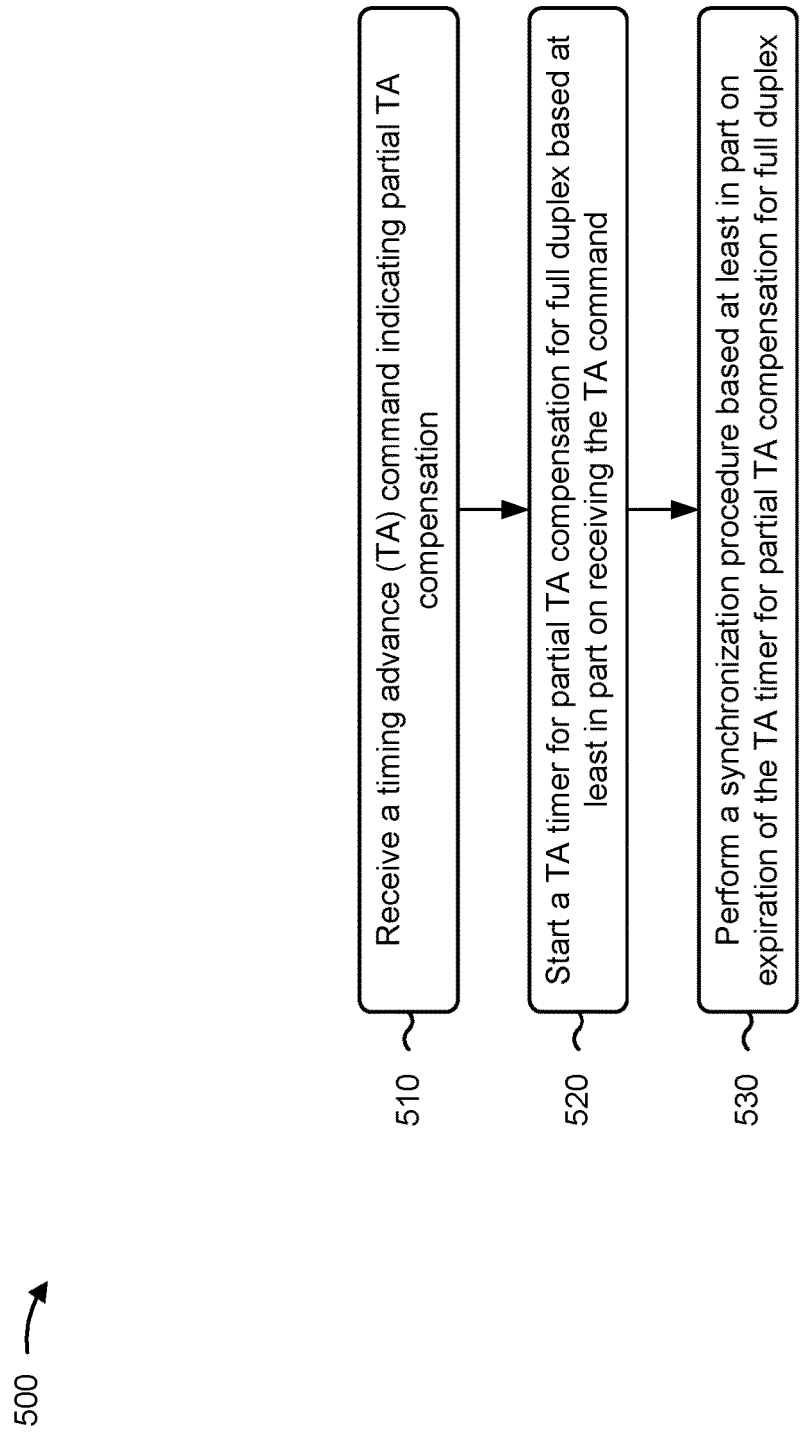
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., a UE 120 depicted in FIGS. 1 and 2, the UE depicted in FIG. 3, UE 420 depicted in FIG. 4) performs operations associated with a TA timer for partial TA compensation for full duplex.

As shown in FIG. 5, in some aspects, process 500 may include receiving a TA command indicating partial TA compensation (block 510). For example, the UE (e.g., using receive processor 258, transmit processor 264, controller/processor 280, memory 282) may receive a TA command indicating partial TA compensation, as described above.

As further shown in FIG. 5, in some aspects, process 500 may include starting a TA timer for partial TA compensation for full duplex based at least in part on receiving the TA command (block 520). For example, the UE (e.g., using receive processor 258, transmit processor 264, controller/processor 280, memory 282) may start a TA timer for partial TA compensation for full duplex based at least in part on receiving the TA command, as described above.

As further shown in FIG. 5, in some aspects, process 500 may include performing a synchronization procedure based at least in part on expiration of the TA timer for partial TA compensation for full duplex (block 530). For example, the UE (e.g., using receive processor 258, transmit processor 264, controller/processor 280, memory 282) may perform a synchronization procedure based at least in part on expiration of the TA timer for partial TA compensation for full duplex, as described above.

Process 500 may include additional aspects, such as any single aspect or any combination of aspects described below and/or in connection with one or more other processes described elsewhere herein.

In a first aspect, performing the synchronization procedure includes performing a random access channel procedure for full duplex.

In a second aspect, alone or in combination with the first aspect, process 500 includes receiving an indication of a duration of the TA timer for partial TA compensation for full duplex.

In a third aspect, alone or in combination with one or more of the first and second aspects, process 500 includes determining a TA compensation coefficient, and determining a duration of the TA timer for partial TA compensation for full duplex based at least in part on the TA compensation coefficient.

In a fourth aspect, alone or in combination with one or more of the first through third aspects, process 500 includes resetting the TA timer for partial TA compensation for full duplex based at least in part on receiving another TA command.

In a fifth aspect, alone or in combination with one or more of the first through fourth aspects, an initial duration of the TA timer for partial TA compensation for full duplex, after a switch by the UE to full duplex from half duplex, is less than a remainder of a TA timer that was used for half duplex before the switch.

In a sixth aspect, alone or in combination with one or more of the first through fifth aspects, process 500 includes switching to half duplex, where an initial duration of a TA timer for half duplex is greater than a remainder of the TA timer for partial TA compensation for full duplex before the switching.

In a seventh aspect, alone or in combination with one or more of the first through sixth aspects, process 500 includes transmitting, during the TA timer for partial compensation for full duplex, an uplink communication based at least in part on the partial TA compensation indicated in the TA command.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with the present disclosure. Example process 600 is an example where the base station (e.g., a base station 110 depicted in FIGS. 1 and 2, the base station depicted in FIG. 3, BS 410 depicted in FIG. 4) performs operations associated with a TA timer for partial TA compensation for full duplex.

As shown in FIG. 6, in some aspects, process 600 may include determining a duration for a TA timer for partial TA compensation for full duplex at a UE. Process 600 may include generating the indication of the duration (block 610). For example, the base station (e.g., using transmit processor 220, receive processor 238, controller/processor 240, memory 242) may generate an indication of a duration for a TA timer for partial TA compensation for full duplex at UE, as described above.

As further shown in FIG. 6, in some aspects, process 600 may include transmitting the indication of the duration (block 620). For example, the base station (e.g., using transmit processor 220, receive processor 238, controller/processor 240, memory 242) may transmit an indication of the duration based at least in part on determining the duration, as described above.

Process 600 may include additional aspects, such as any single aspect or any combination of aspects described below and/or in connection with one or more other processes described elsewhere herein.

In an aspect, the duration is less than a duration of a TA timer for half duplex at the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving a timing advance (TA) command indicating partial TA compensation; starting a TA timer for partial TA compensation for full duplex based at least in part on receiving the TA command; and performing a synchronization procedure based at least in part on expiration of the TA timer for partial TA compensation for full duplex.

Aspect 2: The method of Aspect 1, wherein performing the synchronization procedure includes performing a random access channel procedure for full duplex.

Aspect 3: The method of Aspect 1 or 2, further comprising receiving an indication of a duration of the TA timer for partial TA compensation for full duplex.

Aspect 4: The method of any of Aspects 1-3, further comprising: determining a TA compensation coefficient; and determining a duration of the TA timer for partial TA compensation for full duplex based at least in part on the TA compensation coefficient.

Aspect 5: The method of any of Aspects 1-4, further comprising resetting the TA timer for partial TA compensation for full duplex based at least in part on receiving another TA command.

Aspect 6: The method of any of Aspects 1-5, wherein an initial duration of the TA timer for partial TA compensation for full duplex, after a switch by the UE to full duplex from half duplex, is less than a remainder of a TA timer that was used for half duplex before the switch.

Aspect 7: The method of any of Aspects 1-6 further comprising switching to half duplex, wherein an initial duration of a TA timer for half duplex is greater than a remainder of the TA timer for partial TA compensation for full duplex before the switching.

Aspect 8: The method of any of Aspects 1-7, further comprising transmitting, during the TA timer for partial compensation for full duplex, an uplink communication based at least in part on the partial TA compensation indicated in the TA command.

Aspect 9: A method of wireless communication performed by a base station, comprising: generating an indication of a duration for a timing advance (TA) timer for partial TA compensation for full duplex at a user equipment (UE); and transmitting the indication of the duration.

Aspect 10: The method of Aspect 9, wherein the duration is less than a duration of a TA timer for half duplex at the UE.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the memory and the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a timing advance (TA) command indicating partial TA compensation;
   starting a TA timer for partial TA compensation for full duplex based at least in part on receiving the TA command, the TA timer for partial TA compensation for full duplex having a duration that is smaller than a duration of a TA timer for full TA compensation for half duplex; and
   performing a synchronization procedure based at least in part on expiration of the TA timer for partial TA compensation for full duplex.

2. The method of claim 1, wherein performing the synchronization procedure includes performing a random access channel procedure for full duplex.

3. The method of claim 1, further comprising receiving an indication of the duration of the TA timer for partial TA compensation for full duplex.

4. The method of claim 1, further comprising:
   determining a TA compensation coefficient; and
   determining the duration of the TA timer for partial TA compensation for full duplex based at least in part on the TA compensation coefficient.

5. The method of claim 1, further comprising resetting the TA timer for partial TA compensation for full duplex based at least in part on receiving another TA command.

6. The method of claim 1, wherein an initial duration of the TA timer for partial TA compensation for full duplex, after a switch by the UE to full duplex from half duplex, is less than a remainder of a TA timer that was used for half duplex before the switch.

7. The method of claim 1, further comprising switching to half duplex, wherein an initial duration of a TA timer for half duplex is greater than a remainder of the TA timer for partial TA compensation for full duplex before the switching.

8. The method of claim 1, further comprising transmitting, during the TA timer for partial compensation for full duplex, an uplink communication based at least in part on the partial TA compensation indicated in the TA command.

9. A method of wireless communication performed by a network entity, comprising:
   generating an indication of a duration for a timing advance (TA) timer for partial TA compensation for full duplex at a user equipment (UE), the duration of the TA timer for partial TA compensation for full duplex being smaller than a duration of a TA timer for full TA compensation for half duplex; and
   transmitting the indication of the duration.

10. A user equipment (UE) for wireless communication, comprising:
    a memory; and
    one or more processors, coupled to the memory, configured to:
       receive a timing advance (TA) command indicating partial TA compensation;
       start a TA timer for partial TA compensation for full duplex based at least in part on receiving the TA command, the TA timer for partial TA compensation for full duplex having a duration that is smaller than a duration of a TA timer for full TA compensation for half duplex; and
       perform a synchronization procedure based at least in part on expiration of the TA timer for partial TA compensation for full duplex.

11. The UE of claim 10, wherein the one or more processors, to perform the synchronization procedure, are configured to perform a random access channel procedure for full duplex.

12. The UE of claim 10, wherein the one or more processors are configured to receive an indication of the duration of the TA timer for partial TA compensation for full duplex.

13. The UE of claim 10, wherein the one or more processors are configured to:
    determine a TA compensation coefficient; and
    determine the duration of the TA timer for partial TA compensation for full duplex based at least in part on the TA compensation coefficient.

14. The UE of claim 10, wherein the one or more processors are configured to reset the TA timer for partial TA compensation for full duplex based at least in part on receiving another TA command.

15. The UE of claim 10, wherein an initial duration of the TA timer for partial TA compensation for full duplex, after a switch by the UE to full duplex from half duplex, is less than a remainder of a TA timer that was used for half duplex before the switch.

16. The UE of claim 10, wherein the one or more processors are configured to switch to half duplex, wherein an initial duration of a TA timer for half duplex is greater than a remainder of the TA timer for partial TA compensation for full duplex before the switching.

17. The UE of claim 10, wherein the one or more processors are configured to transmit, during the TA timer for partial compensation for full duplex, an uplink communication based at least in part on the partial TA compensation indicated in the TA command.

18. A network entity for wireless communication, comprising:
a memory; and
one or more processors, coupled to the memory, configured to:
generate an indication of a duration for a timing advance (TA) timer for partial TA compensation for full duplex at a user equipment (UE), the duration of the TA timer for partial TA compensation for full duplex being smaller than a duration of a TA timer for full TA compensation for half duplex; and
transmit the indication of the duration.

* * * * *